United States Patent [19]

Rees et al.

[11] 4,385,380
[45] May 24, 1983

[54] DIGITAL CONCENTRATOR SWITCH

[75] Inventors: Frederick H. Rees; Daniel F. Martin; Joseph P. Ryness, all of London, England

[73] Assignee: Standard Telephones and Cables Limited, England

[21] Appl. No.: 240,228

[22] Filed: Mar. 3, 1981

[30] Foreign Application Priority Data

Mar. 4, 1980 [GB] United Kingdom ............... 8007306

[51] Int. Cl.$^3$ ..................... H04Q 11/04; H04J 3/14
[52] U.S. Cl. .................................. 370/65; 370/87; 179/18 FC
[58] Field of Search ............ 370/15, 65, 86, 87, 370/88, 89, 90; 179/18 FC, 27 A

[56] References Cited

U.S. PATENT DOCUMENTS

| Re. 28,958 | 9/1976 | Zafiropulo et al. | 370/87 |
|---|---|---|---|
| 2,929,879 | 3/1960 | Jacobaeus et al. | 370/65 |
| 3,786,418 | 1/1974 | Nick | 370/86 |
| 3,965,301 | 6/1976 | Kerorkian | 370/65 |

Primary Examiner—Benedict V. Safourek
Attorney, Agent, or Firm—James B. Raden; Marvin M. Chaban

[57] ABSTRACT

In a fully digital telephone switching system, a digital switch may serve a number of PCM sub systems each having separate forward and reverse highways and each serving a number of subscribers' lines. The highways are grouped in blocks of eight, from which intelligence is received in serial byte-interleaved form and converted by serial-parallel converters to parallel byte-interleaved form. While in this form they are switched to other channels and applied to a super-multiplexer which they leave in parallel byte-interleaved form from which they are restored by another converter to serial byte-interleaved form for application to the switch's outputs. For the reverse channel the arrangement is the reverse of the above, i.e. serial-parallel conversion, switching and parallel-serial conversion to the line multiplex highways. For local calls a loop-back connection is provided via a fixed delay of half a frame time. Thus, if the outputs fail, the arrangement can still handle local calls. Further it is usable on its own as a small exchange.

4 Claims, 1 Drawing Figure

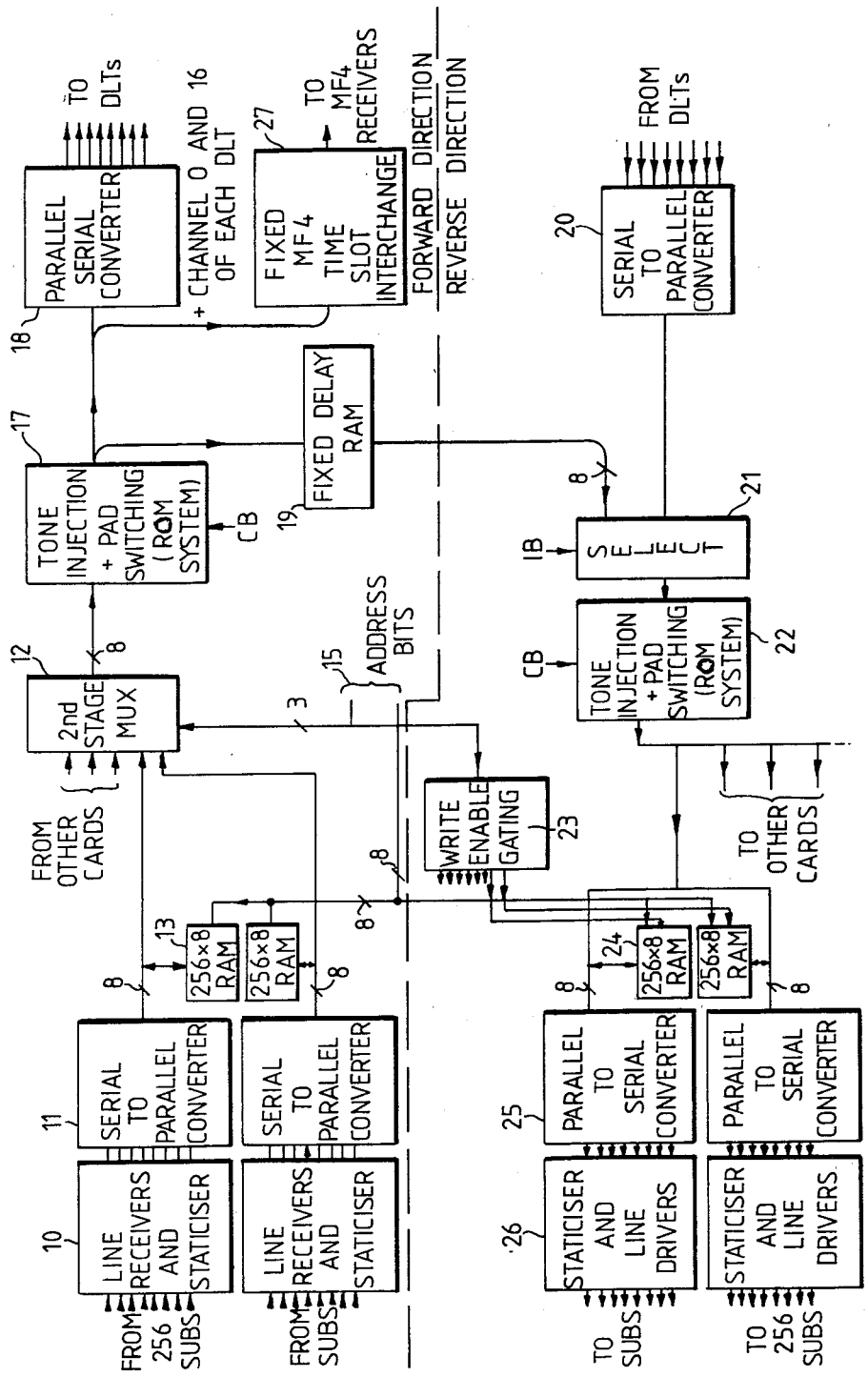

DIGITAL CONCENTRATOR SWITCH

The present invention relates to a digital switch for handling time division multiplexed (TDM) pulse code modulation (PCM) intelligence.

It is known in such switches for the PCM words or bytes received over TDM highways into the switch to be converted from serial to parallel format for handling within the switch, often with the reverse conversion at the output side of the switch. In addition the thus converted data is super-multiplexed within the switch so that, for instance, with 8 bit words these words from eight PCM highways are super-multiplexed onto one highway within the switch. Such a process is used separately for GO and RETURN paths. Such an arrangement has been found to give economies as compared with the switching of individual serial highways.

An object of the present invention is to provide an improvement to a switch of the above type.

According to the invention there is provided an electrical digital switching arrangement for handling time division multiplexed (TDM) pulse code modulation (PCM) intelligence, in which separate forward and reverse highways are provided for each of a number of PCM systems between which switching is effected, in which a loop-back connection between the portions of the arrangement for two directions is provided so that when a call is to be set up between two subscriber lines served by the arrangement that call is set up wholly within that arrangement and in which when a said call is set up via the loop-back connection a delay is introduced which is appropriate to the time difference between the two TDM channels to allocated respective ones of which the two lines to be connected.

According to the invention there is further provided an electrical digital switching arrangement for handling time division multiplexed (TDM) pulse code modulation (PCM) intelligence, which includes inputs from the forward channels of a number of TDM highways each of which serves a number of subscriber lines, the PCM bytes being received from the highways in byte-interleaved serial manner, a second-stage multiplexer to which the bytes from the highways are applied via serial-to-parallel conversion means, which multiplexer multiplexes the PCM bytes together into byte-interleaved parallel manner to give a super-multiplexed output from the said multiplexer, a super-multiplexed input via which super-multiplexed PCM bytes for the lines served are received in byte-interleaved parallel manner, first selection means to which said input is applied and which applies the PCM bytes to parallel-to-serial conversion means, the results of the conversion effected by said parallel-to-serial conversion means being applied to the reverse channels of the TDM highways to the respective subscriber lines, further selection means for controlling calls involving respective ones of the lines served as needed for the calls to be set up through the switching arrangement, a loop-back connection from the super-multiplexed output from said forward channels to the first selection means which loop-back connection introduces a fixed delay to which the bytes passing via that connection are subjected, and means under control of the further selection means whereby the first selection means can be set to a first condition for a call to be set up wholly within the arrangement or to a second condition for a call to be set up which is not wholly within the arrangement, in which the said serial-to-parallel conversion means and the said parallel-to-serial conversion means both include temporary storage for the PCM bytes being dealt with, in which for a call to be set up wholly within the arrangement the first selection means is set to its said first condition wherein the loop-back connection is used, the delay to which the PCM bytes are subjected having a value appropriate to the time difference between the TDM channels allocated to the respective ones of the lines invalued in the call, and in which for a call to be set up which is not wholly within the arrangement the first selection means is set to its said second condition wherein the loop-back connection is not used.

It will be appreciated that with such a system if the output side of the switch should fail, local calls can still be set up via the loop-back connection. Further, such a switch, with only the loop-back connection at the "output" side is usable as a small local exchange.

Hence the present invention also provides an electrical digital telephone exchange for handling time-division multiplexed (TDM) pulse code modulation (PCM) intelligence, which includes inputs from the forward channels of a number of TDM highways each of which serves a number of subscriber lines, the PCM bytes being received from the highways in byte-interleaved serial manner, a second-stage multiplexer to which the bytes from the highways are applied via serial-to-parallel conversion means, which multiplexer multiplexes the bytes together in byte-interleaved parallel manner to give a super-multiplexed output from the said multiplexer, a super-multiplexed input via which super-multiplexed PCM bytes for the lines served are received in byte-interleaved parallel manner, parallel-to-serial conversion means to which the super-multiplexed input is applied, the results of the conversion effected by said parallel-to-serial conversion means being applied to the reverse channels of the TDM highways to the respective subscriber lines, and a loop-back connection from the super-multiplexed output from said forward channels to the super-multiplexed input to the reverse channels and thus to the parallel-to-serial conversion means, which loop-back introduces a fixed delay to which the bytes passing via that connection are subjected, in which the said serial-to-parallel conversion means and the said parallel-to-serial conversion both include temporary storage for the bytes being dealt with, and in which a call to be set up between two of the lines served by the exchanger is set up via the loop-back connection, the delay to which the PCM bytes are subjected having a value appropriate to the time difference between the TDM channels allotted to the respective ones of the lines involved in the call.

An embodiment of the invention will now be described with reference to the accompanying highly simplified block schematic drawing.

The arrangement shown in the drawing serves a number, eight in this case, of blocks of subscribers, each consisting of 256 subscribers, and served by eight PCM systems, each serving 32 subscriber lines, each of which is allocated one time slot on his PCM system. The systems are "four-wire", i.e. separate forward and reverse highways are provided, and PCM words or bytes are received from and sent to the subscribers' lines in serial byte-interleaved form. As will be seen, the internal highway within the switching arrangement is organised in parallel byte interleaved manner with a bit rate of 2.048 Mb/s. After switching, the intelligence is converted back to serial form for transmission over eight thirty-channel PCM systems. These latter are also "four-wire", and are similar to the PCM systems leading to the lines, with the difference that two slots are allotted to signalling and synchronisation functions.

The intelligence in the parallel byte-interleaved form may be looped back from the forward side of the switching arrangement to the reverse side with a half frame delay. This enables local calls to be set up within the switching arrangement, which is useful if the arrangement is a line concentrator remote from a parent exchange and if the connections to the parent exchange should fail. In such a case the concentrator can continue to handle local calls. Furthermore, the arrangement can be used as a small local exchange or PABX, with some connections to a remote exchange.

Referring now to the drawing, the arrangement is in two parts, that above the dashed line for the forward direction, and that below the line for the reverse direction. The arrangement can switch up to 2048 subscribers to 256 time slots in a 125 μsec. frame, i.e. the PCM byte rate is 8 KHz. The subscriber's lines are grouped in blocks of 256, each block served by eight 32 channel PCM highways, on which intelligence is received in serial byte-interleaved form. The arrangement shown has eight line receiver and staticiser blocks such as 10 each of which receives eight PCM forward highways. This block includes such pulse re-shaping and amplification as is needed, and staticizes each received byte, for application to a serial-to-parallel converter 11, from which the intelligence passes to a second stage multiplexer 12 and to a RAM 13. The converter 11, like most of the blocks included in the drawing is a "custom" chip.

The "parallelised" bytes are thus stored sequentially in the locations of the RAM 13, which is a 256 byte store, each byte location being able to accommodate an eight bit byte during the first half of a 2.048 MHz time slot. These bytes now await switching, which is controlled from the central control (not shown) of the system using the arrangement shown. To switch the bytes from one subscriber's line, the central control sends an eleven bit address in a selected time slot (on the 2.048 MHz highway) to define the line whose byte is to be switched to that time slot. This address, received over the connections shown at 15 is applied to all of the RAMs such as 13 and to the multiplexer 12. Eight bits of the address selects the same-numbered location in all RAM's such as 13 while the other three bits are applied to the multiplexer 12 to cause it to select the block from which a byte is to be switched. This addressing is effected in the second half of the 2.048 MHz time slot. Note that the multiplexer 12 has inputs from all eight of the converters such as 11.

The output from the multiplexer 12, which is in parallel byte-interleaved "super multiplexed" form is applied to a so-called ROM system 17, and if it is speech during an established connection it passes through the system 17 unaltered. This system includes a read-only memory, and its function is tone generation and injection, and in some cases pad switching. Pad switching is necessary where lines with widely varying attenuation characteristics are present, in which case for some at least of the calls to be set up, pads may have to be switched in. This system is controlled from the central control over an input CB, via which central control supplies a control word for each of the 256 time slots to define whether the output of the ROM system 17 is unattenuated speech, or attenuated speech (in which case the control word indicates which pad is to be cut in), or whether a tone, suitably cadenced, is to be injected into the particular time slot.

From the ROM system 17 the speech or other intelligence passes to a parallel-to-serial converter 18, which may be the same "custom" chip as the converter 11 but used "in reverse", the output of which is eight 30 channel PCM highways. As already mentioned, only 30 channels are usable on these highways since channels 0 and 16 are used for synchronisation and signalling.

The output of the ROM system is also applied to a fixed delay RAM 19 and stored therein and read out half a frame later to give the loop-back facility. As will be seen later, this provides the facility whereby local calls can be set up wholly within the arrangement shown.

In the reverse direction, byte-interleaved serial intelligence arrives via eight 30 channel PCM highways at a serial-to-parallel converter 20. The output of this converter is applied to a select unit 21, to which the output of the fixed delay RAM 19 is also connected, and at which it is multiplexed with the output of the RAM 19. The central control determines the loop-back status of each time slot, i.e. it decides whether that time slot is in use of intelligence from the converter 20 or the RAM 19. This control is effected via an isolation bit input IB.

The data which leaves the block 21, which in normal operation is usually the bytes received from the converter 20, passes therefrom to another ROM system 22, which is very similar to the system 17. Thus, dependent upon the control word applied to it from the central control via the input CB, this block 22 passes unattenuated speech, attenuated speech, or cadenced tones.

The intelligence in both directions is aligned at this point, so the same eleven bit address is used to control both reverse and forward switches. Thus the three high order address bits enable the write pulses for one of the eight reverse-direction RAM's such as 24. Intelligence is read from the sequential RAM locations in the first half of a 2.048 MHz on all eight blocks of 256 subscribers, but only one of these is effective due to the selection due to the first three bits. To effect this, the write enable gating 23 controls writing into the selected one of the RAM's 24.

From the appropriate one of the RAM's 24 the intelligence goes to a parallel-to-serial converter 25 from which it passes to a staticiser and line driver block 26. The output of this latter is eight 32-channel PCM highways, and these give access to the lines served.

The fixed delay RAM 19, which introduces a half-frame delay, enables local calls, i.e. calls in which both lines are in the same 2048, to be set up without proceeding further into the system. If the arrangement shown is at a concentrator, this means that for a local call the parent exchange is not involved. In addition, if the links to the parent exchange all fail, then the concentrator can still function for local calls. Note that such a call uses two time slot channels separated in time by half a frame.

If the communication to the parent exchange fails when there are local calls in existence which do not use the loop-back connection, these calls can in some cases be re-arranged so as to use such connections under control of the controlling program of microprocessors in the various blocks shown. When such a re-arrangement takes place it is extremely unlikely that the subscribers involved in the re-arranged calls would realise that anything had happened.

Normally in a concentrator system charging is effected at the parent exchange: in the present system if the communication to the parent exchange fails normal telephone calls set up via the RAM 19 are not charged during the failure period.

A system as described with or without the blocks 18 and 20 can be used as a local exchange, or a PABX, with links to a main exchange or (in the case of a PABX) an exchange in the public network.

Only 240 of the 256 time slots on the internal "super multiplex" are available for speech, as two time slots out of each 32 are used for synchronisation and signalling. In the forward direction the remaining 16 time slots are assigned to multifrequency signalling (e.g. MF4), and the ROM system 17 outputs for these time slots are stored in the block 27 and then transmitted over a serial PCM link to a VF receiver.

Considered from the "equipment practice" aspect, each level of switching provides four cards for 512 subscribers, plus one card for each additional 512 subscribers.

In the interest of system security, the arrangements shown in the drawing are triplicated, with the outputs from blocks 18, and 26, taken via majority decision gating (not shown). This functions in known manner to give a majority decision output, and gives an alarm in the event of any discrepancies being detected. The majority decision gating and the alarm circuitry associated therewith are not shown to avoid needlessly complicating the drawing.

We claim:

1. A digital line concentrator for a system using time division multiplexed transmission (PCM) for communicating between a plurality of subscriber lines and a central exchange controlling said concentrator, said system employing pulse code modulation within the concentration and between the concentrator and the exchange, in which there are separate forward highways for communication from said subscriber lines through said concentrator directed toward said exchange and reverse direction highways from the exchange toward the subscriber lines, and in which the pulse code modulation employs a plurality of channels allocated for the transfer of call communication intelligence, the invention comprising a loop back path within the concentrator between the forward highways and the reverse highways for completing calls within the concentrator, said path including means for introducing delay into all calls being completed over said loop back path, the delay means comprising a memory for storing intelligence from said channels for a period of one half of a time frame, a time frame being defined as a period during which intelligence from each of said channels is transmitted.

2. A digital line concentrator as claimed in claim 2, there are further means for temporarily storing intelligence from each of the channels, and means for controlling the storage of intelligence in said temporary storage means to produce any additional time delay needed for the completion of intelligence transfer in a loop back call.

3. A remote line concentrator for a time division multiple channel system having an exchange for receiving digital data from the concentrator for completing calls from said concentrator to said exchange and from said exchange to said concentrator, said concentrator comprising a plurality of groups of subscriber lines, an outgoing network coupled to said concentrator to transmit digital data from the lines to the exchange, an incoming network coupled to said lines to transmit digital data from the exchange toward said lines, each outgoing network comprising storage with capability of one byte of intelligence from each channel, control of transmission from said storage originating at the exchange and being forwarded to said concentrator for transmission of an addressed byte over said outgoing network in byte interleaved format, a loop back path from said outgoing network to said incoming network, storage means in said loop back path for storing outgoing bytes of intelligence, said storage means imposing a delay of fixed duration on bytes of intelligence in said loop back path, and selected means for transmitting bytes of intelligence from said loop back path storage means to said incoming network to complete the transfer of bytes of intelligence within the concentrator from a line of said concentrator to a line of said concentrator.

4. A concentrator as claimed in claim 3, in which bytes of intelligence for lines of said concentrator are fed from the exchange to said incoming network and to said select means for selection of a byte from either said loop back path or from said exchange.

* * * * *